UNITED STATES PATENT OFFICE.

CARL SPÄTH, OF STEGLITZ, NEAR BERLIN, GERMANY, ASSIGNOR TO ACTIEN GESELLSCHAFT FÜR ANALIN FABRIKATION, OF BERLIN, GERMANY.

PROCESS OF MAKING SCREENS FOR COLOR PHOTOGRAPHY.

946,470. Specification of Letters Patent. Patented Jan. 11, 1910.

No Drawing. Original application filed March 17, 1909, Serial No. 484,028. Divided and this application filed October 2, 1909. Serial No. 520,695.

*To all whom it may concern:*

Be it known that I, CARL SPÄTH, a subject of the Emperor of Germany, residing at Steglitz, near Berlin, Germany, have invented certain new and useful Improvements in Processes of Making Screens for Color Photography, of which the following is a specification.

My invention relates to a new kind of screens for color photography made from chromated gelatin, which is essentially characterized by the fact that the colors are distributed in one single layer of gelatin and that the small lines and figures filled by the different colors are symmetrically arranged. In the manufacture of such screens which has recently become known, advantage is taken of the fact that certain dye-stuffs will dye gelatin which has been treated with bichromate and exposed to light, in preference to gelatin which has not been so treated, while other dyestuffs will dye the unaltered gelatin in preference to the treated gelatin. If, therefore, a chromated layer of gelatin be exposed to light beneath a screen ruled with black lines—commonly called a black-white screen—and subsequently washed to remove bichromate, a two color screen can be prepared by dyeing the layer with appropriate dyestuffs. In order to obtain such a new screen I proceed as follows, the process being performed in two steps, the first of which consists in making a two-color screen in a layer of chromated gelatin, which two-color screen is transformed in the second step into a three-color screen.

For the first step of the process I give the following example: A glass plate, or a flat film of celluloid, or the like, is coated with a thin layer of gelatin and the gelatin sensitized in the usual way by means of potassium bichromate; the plate thus prepared is exposed to light under a black-white screen of about 20 lines per millimeter obtaining thus a set of lines in the gelatin alternately altered and unaltered by the action of light, whereupon the excess of the bichromate is washed out. The plate is then immersed in a dyeing solution containing a red and a green dyestuff, the red dyestuff having affinity for the altered gelatin and the green one for the unaltered gelatin. As such a red dyestuff I may use azo-rubin and ponceau in crystals 6<sup>R</sup> or another suitable dyestuff; as a green dyestuff adapted for my present process I name for instance naphtholgreen. By immersing the plate in such a two-colored solution and then washing out the excess of the dyestuff a red-green screen is obtained. After this first step the plate is sensitized with potassium bichromate for a second time and then exposed to light under the black-white screen turned to a suitable angle, whereupon the plate is washed with water eliminating the excess of bichromate and the green dyestuff also from the small quadrangular elements not altered by the action of light. Now the plate is dyed in a blue solution containing for instance, methyl blue, brilliant blue for wool G and brilliant azurine which have only affinity for the unaltered gelatin. After having washed out the excess of the green dye there results therefore a red-green-blue three-color screen, which, in the same manner as the screen produced above shows in a symmetrical arrangement green and blue quadrangular elements between red lines.

It is obvious to those skilled in the art that my present invention is not limited to the foregoing example or to the details given therein, as for instance to the succession of the dyestuffs employed in my process, etc.

Having thus described my invention what I claim as new and desire to secure by Letters Patent is:

A process of making a three-color screen which consists in dividing a thin layer of chromated gelatin by exposure to light under a black-white screen into a set of lines alternately altered and unaltered by the action of light, removing the excess of bichromate, dyeing the so-prepared gelatin with two colors in a solution of two dyestuffs, one of which is adapted to dye only the gelatin altered by the action of light, and the other to dye only the unaltered gelatin, washing out the excess of dye, sensitizing the gelatin layer for a second time with bichromate, exposing to light under the same black-white screen but the lines crossing the lines of the first exposure at a suitable angle, washing the gelatin to remove the excess of bichromate as well as of the dyestuff, which has affinity only for the unaltered gelatin, from the smaller quadrangular elements of unaltered gelatin produced by the second exposure to light and then dyeing these decolorized small elements with a third dyestuff having the property to dye only the unaltered gelatin.

In testimony whereof I have hereunto set my hand in presence of two subscribing witnesses.

CARL SPÄTH.

Witnesses:
　WOLDEMAR HAUPT,
　HENRY HASPER.